April 26, 1932.    J. CHRIETZBERG    1,855,823
EDUCATIONAL DEVICE
Filed Feb. 26, 1931    2 Sheets-Sheet 1
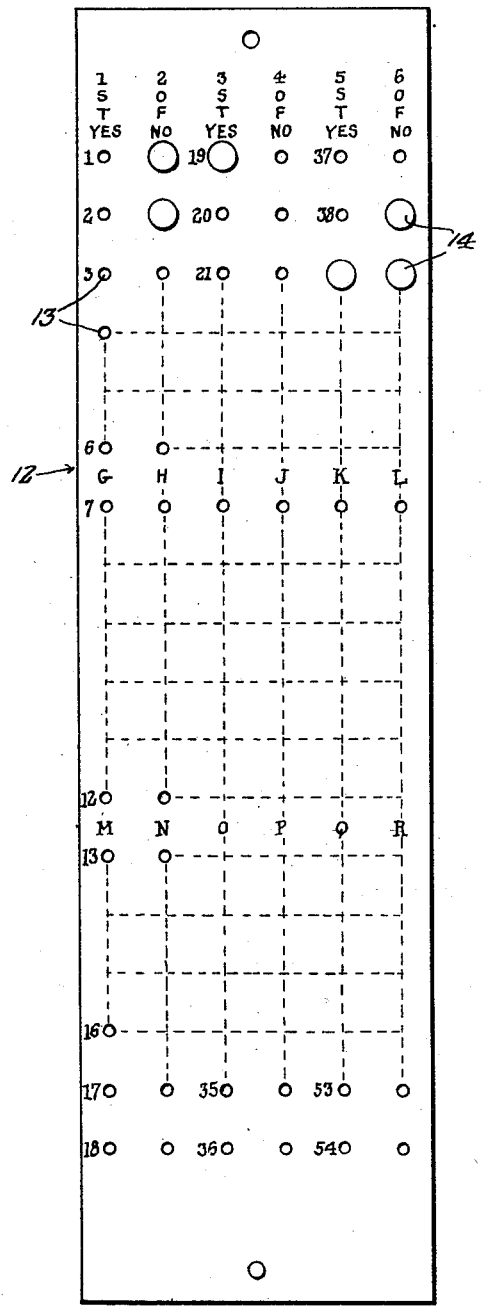
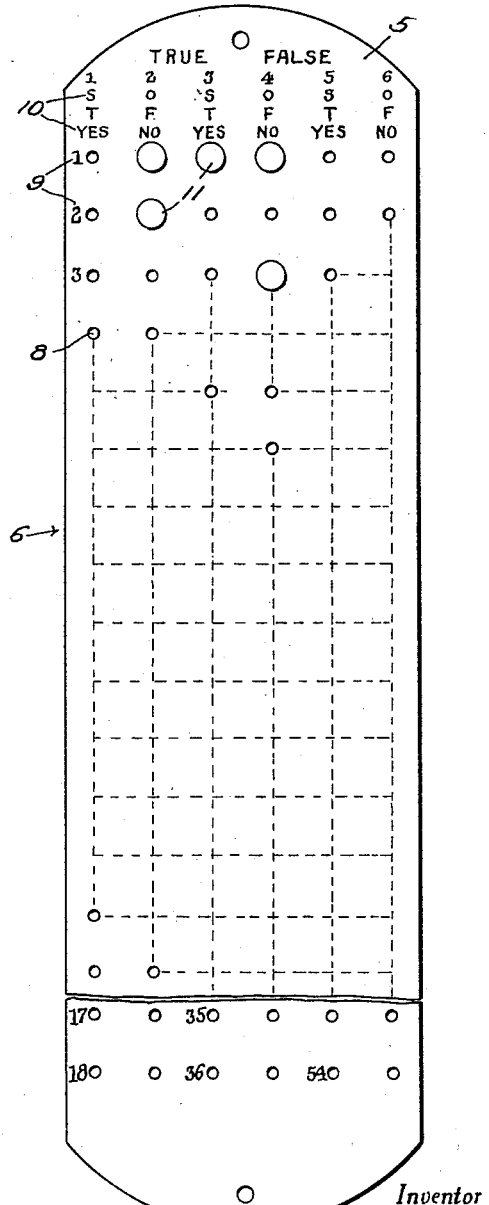
Inventor
James Chrietzberg,
By Clarence A. O'Brien
Attorney April 26, 1932.  J. CHRIETZBERG  1,855,823
EDUCATIONAL DEVICE
Filed Feb. 26, 1931  2 Sheets-Sheet 2
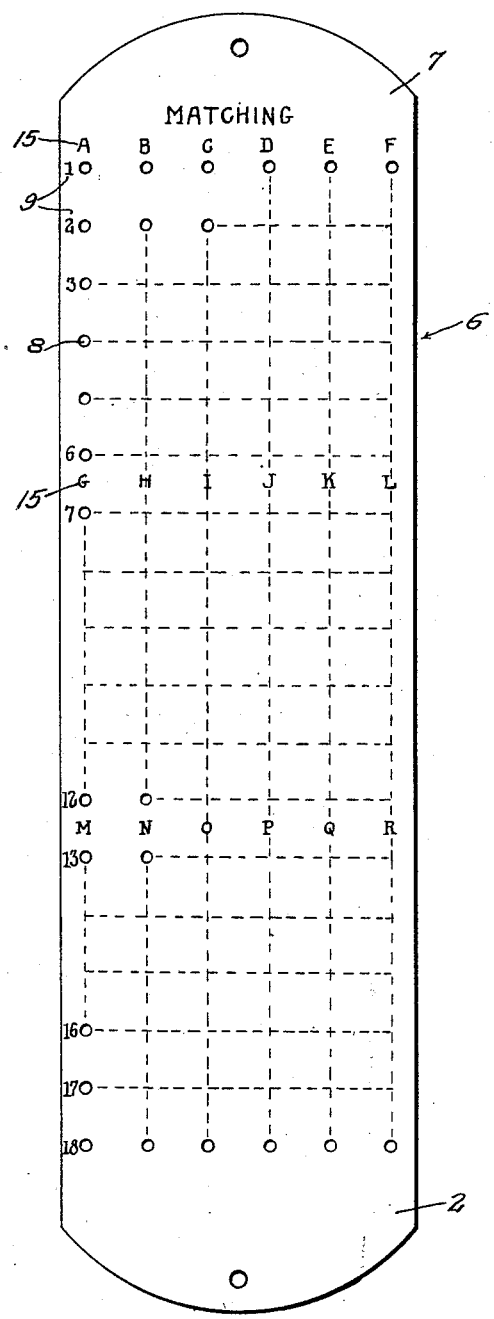
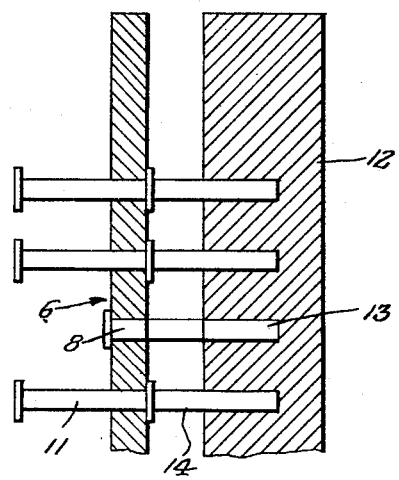
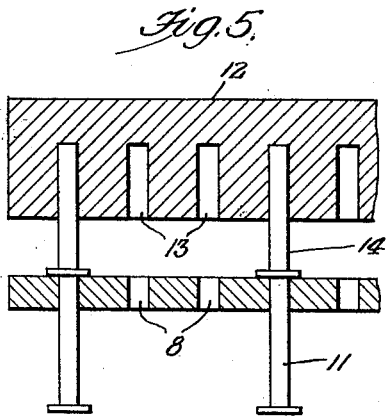
Inventor
James Chrietzberg,
By Clarence A. O'Brien
Attorney Patented Apr. 26, 1932

1,855,823

UNITED STATES PATENT OFFICE

JAMES CHRIETZBERG, OF DEATSVILLE, ALABAMA

EDUCATIONAL DEVICE

Application filed February 26, 1931. Serial No. 518,582.

This invention relates broadly to educational devices, and has more particularly reference to such a device especially designed for checking the answers to problems expeditiously and accurately.

A still further object of the invention is to provide an educational device of the character above mentioned, that is capable for use in giving true and false tests, same and opposite tests, multiple choice tests, and matching tests, although it is to be understood that the device is susceptible to use for other tests not specifically herein stated.

Other objects and advantages of the invention, and the invention itself will be best understood from a study of the following description, taken in connection with the accompanying drawings wherein:

Figure 1 is a plan view illustrating one side of a work board.

Figure 2 is a plan view illustrating one face of a check board.

Figure 3 is a plan view illustrating the reverse face of the work board.

Figure 4 is a fragmentary sectional view illustrative of the manner of using the device.

Figure 5 is a view similar to Figure 4 but taken at right angles thereto.

Referring more in detail to the drawings, 5 designates one face of a work board 6, and 7 the reverse face thereof.

The work board 6 may be formed of wood, or other suitable relatively stiff material and is provided with a plurality of relatively spaced longitudinal rows of openings 8 extending therethrough from face 5 to the opposite face 7 thereof. The apertures 8 are paired, and each pair of apertures on faces 5 and 7 is identified by a suitable character 9.

Each row of the respective pairs of rows on the face 5 of the work sheet 6 is provided with a row of headings 10, the headings of one row of each pair designating a meaning opposite to the meaning of the heading of the second row of each pair to indicate whether or not a question put to the pupil, is true or false, same or opposite, or whether the answer to the question is affirmative or negative.

Each of the pupils is provided with a plurality of answering pegs or pins 11. Let it now be presumed that a true or false test is given to the class. Each pupil is provided with a work board 6, and a plurality of pins or pegs 11. The pupil reads from the blackboard or sheet of paper on which the test has been written a particular question, for example, the first question of the test. If in his opinion the statement constituting the first question is true he pushes a peg or pin 11 through that hole of the pair of holes designated by the character 1, which hole of said pair will of course be in the column under that series of headings involving the letter T. In other words he will place the pegs in the very first hole of a column of holes whose row of headings is indicated by the identifying numeral 1 at the upper end of the work board. If, on the other hand, the statement involving the first problem, is, according to his judgment false, he will place the peg in the other hole of said pair of holes identified by the character 2. Each question of the test is answered in like manner until the test is completed.

In checking the work sheet of each student, the teacher or professor will use a check board designated generally by the reference character 12. The check board 12 is provided with checking means in the forms of pairs of rows of sockets 13, which sockets are arranged so that there is one socket below each aperture 8 when the workboard 6 is disposed over the check board 12 as is required to determine the result of the test.

The use of the check board 12 will be apparent from the following: When a true or false test has been given as above suggested, the teacher indicates the correct answers to each of the problems by placing a pin or peg 14 into the proper socket 13. Obviously then, in checking each pupil's work board, the boards 6 and 12, being arranged as suggested in Figures 4 and 5, the answer pegs in the apertures 8 of board 6, will either aline with the check pegs 14 or with those sockets 13 into which no pegs have been placed. If the pupil has failed to put any or all the pegs in the proper apertures 8, those pegs placed within the correct aperture will contact the pegs or pins 14 properly located on the check board 12 with the result that all correctly located pegs 11 be pushed upwardly to the position suggested in Figures 4 and 5, and the teacher will then be able to tell at a glance the number of questions the pupil has correctly answered.

Yes-no and same-opposite tests are given and graded in the same manner as the true-false test.

Multiple-choice tests are given in the following manner: Let it be presumed the teacher presents this question: 1. Who was the first President of the United States (1) Adams—(2) Jefferson—(3) Wilson—(4) Harding—(5) Washington—(6) Lincoln. The teacher pulls out the peg 14 from its socket 13 of the first row of sockets 13 provided in the check board 12, leaving all the other pegs in the row, since Washington is the fifth President suggested. The pupil, using the work board 6 places a peg 11 in the fifth hole of the first row of holes 8. If he puts the peg in any other hole, that peg which is pushed up to the position suggested in Figure 4 when the work board 6 and check board 12 are arranged in the manner suggested in Figure 4. The pushed up peg thus designates that the answer given by the pupil is incorrect.

The device is also capable of use for checking answers to matching tests. To this end, the work board 6 has the apertures 8 of each row grouped, each group of apertures including a predetermined number of apertures, and each group of apertures 8 is identified on the side 7 of the work board by an identifying character 15, the character being preferably a letter of the alphabet. The sockets 13 of check board 12 are likewise grouped and has each group of sockets indicated by identifying marks which are duplicates of the identifying mark 15.

Matching tests are given in the following manner: The pupil employs the space 7 of the work board 6. The teacher puts on the blackboard or on a sheet of paper a group of six questions numbered consecutively from one to six. Likewise on the blackboard or a sheet of paper the teacher places a column of answers to the six questions and identifies each question by identifying marks which are duplicate of the identifying marks 15 as for example the answers would be identified by the letters A to F inclusive. The pupil upon ascertaining, as for example the nature of the question 1, pushes a peg in the correct answer aperture in the answer column A to F of the test sheet. Let it be supposed, that the correct answer is identified by the letter D.

The pupil then puts a peg 13 in the very first aperture in that row or column of apertures identified by the letter D on face 7 of his work board 6. The same process is followed out for the remaining five questions of the first group.

A second group of questions and answers may then be offered to the pupils, the question of the second group being numbered 7 to 12 inclusive, and the answers identified by the letters G to I inclusive, and the pupils then match the answers and questions in identically the same manner as described with reference to the first group of questions and answers. A third group of questions and answers may be also matched in the same manner, the questions of the third group being numbered 13 to 18 inclusive, and the answers to the questions of said group identified by the letters M to R inclusive. The teacher then uses the check board 12 in a manner thought apparent and any improperly or inaccurately placed peg 11 will be forced through its aperture 8 when the boards 6 and 12 are arranged in the manner suggested in Figures 4 and 5 thus permitting the teacher to readily check the work board of each pupil.

Even though I have herein shown and described the preferred embodiment of the invention, it is to be understood that the same is susceptible to changes, modifications and improvements coming within the scope of the appended claim.

Having thus described my invention, what I claim as new is:

In an educational device, a work sheet having a plurality of perforations and indicia associated with said perforations, pins for insertion through said perforations, a check sheet having a plurality of sockets for registration with said perforations and pegs adapted to be placed in said sockets and having the outer portions thereof enlarged diametrically to form respective heads for engagement by those pins which are improperly inserted through the perforations in the work sheet causing the retraction of such pins.

In testimony whereof I affix my signature.

JAMES CHRIETZBERG.